(12) United States Patent
Smith et al.

(10) Patent No.: US 6,305,242 B1
(45) Date of Patent: Oct. 23, 2001

(54) CAMSHAFT ALIGNMENT

(75) Inventors: Damian P. Smith, Egnach (CH); Hanz-Jurg Nydegger, Wycombe (GB); Gary Steven Antcliff, Columbus, IN (US); David J. S. Page, Mayland; Vic Wiffen, North Laindon, both of (GB)

(73) Assignees: Cummins Engine Company Ltd., Darlington; Iveco (UK) Ltd., Watford; New Holland U.K. Ltd., Basildon, all of (GB)

( * ) Notice: Subject to any disclaimer, the term of this patent is extended or adjusted under 35 U.S.C. 154(b) by 0 days.

(21) Appl. No.: 09/390,108

(22) Filed: Sep. 3, 1999

(30) Foreign Application Priority Data

Sep. 4, 1998 (GB) .................................................. 9819200

(51) Int. Cl.[7] .................................................. F16H 53/00
(52) U.S. Cl. ..................... 74/567; 123/90.27; 123/90.31; 29/464; 29/808.01
(58) Field of Search ............................... 74/567; 123/58.1, 123/56.1, 90.27, 90.31; 29/888.01, 888.1, 464

(56) References Cited

U.S. PATENT DOCUMENTS

| | | |
|---|---|---|
| 1,282,571 | 10/1918 | Guay . |
| 1,585,731 | 5/1926 | Oakes . |
| 3,306,276 | 2/1967 | Harkness . |
| 3,447,395 | 6/1969 | Latour . |
| 4,380,216 | 4/1983 | Kandler .............................. 123/90.65 |
| 4,481,912 | * 11/1984 | Stwiorok et al. .................. 123/90.15 |
| 4,483,184 | * 11/1984 | Kunzfeld ............................. 73/117.2 |
| 4,530,318 | * 7/1985 | Semple ............................... 123/90.17 |
| 4,573,439 | * 3/1986 | Kasting ............................ 123/195 A |
| 4,984,539 | * 1/1991 | Shinoda et al. ...................... 12/41.42 |
| 5,065,720 | 11/1991 | Nishiyama ........................... 123/363 |
| 5,497,735 | 3/1996 | Kern .................................... 123/90.6 |
| 5,605,077 | * 2/1997 | Tsunoda et al. ........................ 74/567 |
| 5,694,892 | * 12/1997 | Reatherford ........................... 74/567 |
| 5,778,841 | * 7/1998 | Reedy et al. ........................... 74/567 |
| 5,860,328 | * 1/1999 | Regueiro ................................ 74/567 |
| 5,924,334 | * 7/1999 | Hara et al. ............................. 74/567 |
| 5,960,757 | * 10/1999 | Ushida .................................. 74/567 |

FOREIGN PATENT DOCUMENTS

| | | |
|---|---|---|
| 525120 | 8/1972 | (CH) . |
| 0 473 061 A2 | 3/1992 | (EP) . |

* cited by examiner

Primary Examiner—David A. Bucci
Assistant Examiner—Chong H. Kim
(74) Attorney, Agent, or Firm—Gary M. Gron

(57) ABSTRACT

A camshaft 10 has alignment formations at one axial end for enabling the camshaft 10 to be correctly aligned with another component during assembly. In the invention, the alignment formations comprise two bores 18 of the same diameter but different depth.

8 Claims, 1 Drawing Sheet

CAMSHAFT ALIGNMENT

FIELD OF THE INVENTION

The present invention relates to the alignment of a camshaft with another component during assembly.

BACKGROUND OF THE INVENTION

The phasing of a camshaft in relation to an engine crankshaft is of critical importance to engine operation and it is important to be able to position the camshaft in a predetermined orientation during its assembly with other components such as the gear that forms part of its drive train.

SUMMARY OF THE INVENTION

According to the present invention, there is provided a camshaft having alignment formations by means of which the camshaft can be supported, which formations additionally serve to enable the camshaft to be correctly oriented in relation to another component during assembly.

Preferably, means are provided at one axial end of the camshaft for driving the camshaft and the alignment formations are located at the opposite axial end of the camshaft. The means for driving the camshaft may conveniently comprise a collar formed integrally with the camshaft and a gear secured to the collar and meshing with a gear fitted directly to one end, preferably the flywheel end, of the crankshaft.

The alignment formations may suitably comprise two bores of the same diameter but different depth which are preferably located diametrically opposite each other. When two bores of the same diameter are used as alignment formations, they can be drilled using the same tool thereby simplifying the manufacture of the camshaft while still enabling the camshaft to be located in a unique angular position by the use of a jig having two prongs of unequal length.

According to a second aspect of the present invention, there is provided a method of assembling an engine having a camshaft with alignment formations by means of which the camshaft can be supported, which formations additionally serve to enable the camshaft to be correctly oriented in relation to another component during assembly, which method comprises the steps of mounting the crankshaft in the engine block, positioning the crankshaft with a predetermined orientation in the engine block, inserting the camshaft into the engine block, positioning the camshaft with a predetermined orientation in relation to the engine block with the aid of a jig engaging said alignment formations, placing a drive gear on the camshaft to mesh with a gear on the crankshaft while the camshaft and the crankshaft are held in their respective predetermined positions and securing the drive gear to a collar on the camshaft for rotation therewith.

BRIEF DESCRIPTION OF THE DRAWING

The invention will now be described further, by way of example, with reference to the accompanying drawing, in which.

DETAILED DESCRIPTION OF THE PREFERRED EMBODIMENTS

Figure 1:
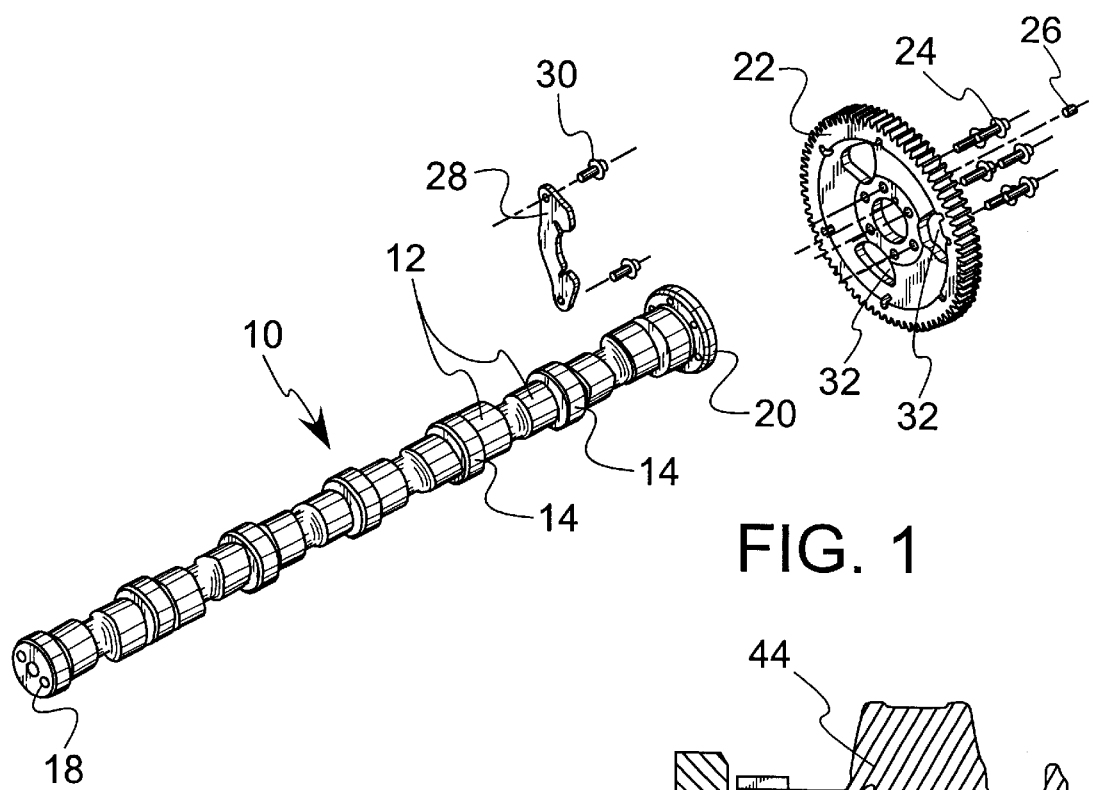
FIG 1 is a exploded view of a camshaft, a camshaft drive gear and a thrust plate to retain the camshaft in an engine block.

FIG. 1 shows a camshaft 10 having cams 12 and support bearings 14 of larger diameter than the lobes of the cams 12. The camshaft is designed to be slid into an engine block from one end. In the engine illustrated in FIG. 2, the camshaft is inserted from the back end of the engine but this is not essential.

The support bearing 14 at one end of the camshaft has two diametrically opposed bores 18 of the same diameter but different depths. The bores 18 can be used to support the camshaft and act as alignment formations as will be described in more detail below.

A collar 20 is formed on the other end of the camshaft 10 and a gear 22 is fitted to the collar 20 by means of bolts 24. The relative orientation of the camshaft 10 and the collar gear 22 is important because the latter drives the camshaft 10 and meshes directly, as described below, with a gear on the crankshaft. In the illustrated preferred embodiment of the invention, a dowel pin 26 is used to ensure the alignment of the cog 22 and the collar 20 but this is not essential. In principle, if the crankshaft and the camshaft are exactly positioned during factory assembly with a predetermined orientation by means of a very precise jig, a dowel pin would not be needed because on alignment of the single marking of the crankshaft gear 42 with the two markings on the cam gear 22, the bores in the gear 22 and the collar 20 would match perfectly. However, the provision of a dowel pin assists dismantling and reassembling the engine in a workshop not equipped with an accurate alignment jig.

The camshaft 10 is retained in the engine block by means of a thrust plate 28 secured to the engine block by bolts 30 that can be tightened even after the gear 22 has been secured to the collar 20 by insertion of a socket spanner through cut-outs 32 formed in the gear 22.

Figure 2:
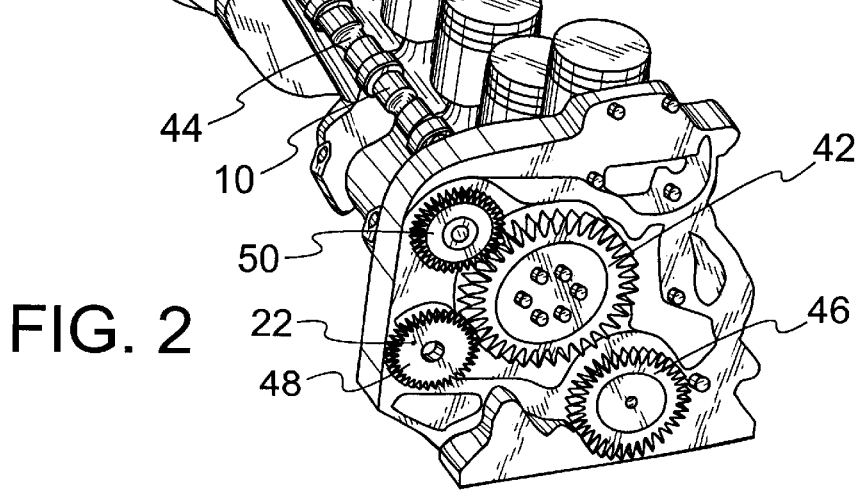
FIG. 2 is a schematic perspective view of the camshaft of FIG. 1 mounted in an engine with the block omitted in the interest of clarity.

As seen from FIG. 2, when the camshaft 10 is inserted in the engine block, the gear 22 meshes with a gear 42 that is directly mounted on the crankshaft 44. The gear 22 also meshes with other cogs 48 and 50 that drive ancillary equipment of the engine, such as a fuel pump.

Figure 3:
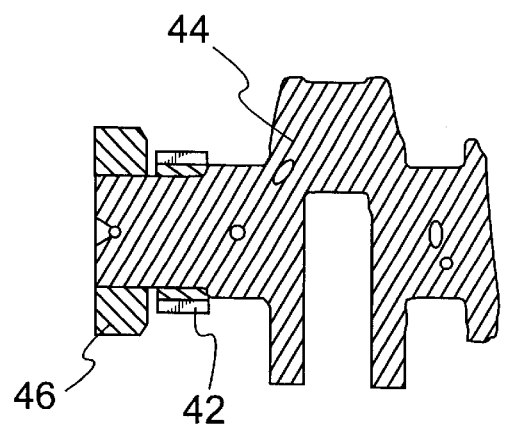
FIG. 3 is a section through one end of the crankshaft of the engine shown in FIG. 2, showing the crank gear and the collar in more detail.

The crankshaft gear 42, as better shown in the section of FIG. 3, is located behind a collar 46 that is mounted on the crankshaft at the rear end of the engine to receive a flywheel. The flywheel damps oscillations of the crankshaft and positioning the cam drive gear 22 at the rear of the engine in this way serves to reduce noise and wear. However, because the collar 46 has a larger diameter than the camshaft gear 42, the gear 22 can only be mounted on the camshaft collar 20 when the camshaft is in situ.

The collar 46 needs to have a relatively large diameter to be able to receive the bolts for fixing the flywheel to it. The diameter of the camshaft gear 42 could be increased so that it would become equal to or even larger than the diameter of the collar 46. However, then the centres of the crankshaft 44 and camshaft 10 would then either need to be moved further apart from each other, necessitating a totally different engine block casting, or one or more idler gears would be needed between the crankshaft gear 42 and the camshaft gear 22, adding to the complexity of the engine.

In order to set the timing correctly, the crankshaft gear 42 has a single marking on the radial side of one of its teeth. If the crankshaft gear 42 and the collar 46 were to abut each other, then it would be impossible to see this marking. For this reason, as shown in FIG. 3, a space is left between the gear 42 and the collar 46. Moreover, the collar 46 is formed with a chamfered edge on its side facing the gear 42 to improve visibility further.

The bores 18 in the camshaft 10 allow it to be picked up and correctly oriented by a jig having two prongs that engage in the bores. If the prongs are of different depth and they penetrate fully into the bores, then it is ensured that the camshaft can only be held in the jig in a unique orientation.

Lastly, one hole is used to feed back to the engine block any oil that has squeezed out of the tail end of the bushing oil feed, which improves bushing life.

The crank gear 42 is attached to the crankshaft 44 in the following manner. The gear 42 is first heated, pressed onto the crankshaft 44 and then cooled. As already mentioned, there is a single marking on the gear 42, but none on the crankshaft 44. To achieve correct orientation of the gear 42 on the crankshaft 44, the crankshaft is positioned in a jig with a predetermined orientation, and then the gear is presented to the shaft again with a predetermined orientation by using a suitable tool. The crank gear 42 and the collar 46 are heated and pressed onto the crankshaft 44 separately because the force needed to push on the collar 46 is higher than that required to push on the gear 42 and the larger force could damage the gear 42.

The thrust plate 28 could in principle be mounted on the engine block before the gear 22 is fitted to the camshaft 10. This would obviate the need for the cut-outs 32 in the gear 22. However, to be able to rotate and axially shift the camshaft 10 more easily during assembly, the bolts 30 are fastened only after the gear 22 has been attached to the camshaft 10.

The sequence in which the elements are mounted in the engine block is therefore as follows. After the crank gear 42 and the collar 46 have been fitted to the crankshaft 44, the crankshaft 44 is mounted onto the engine block. The camshaft 10 is slid into the engine block from the rear end of the engine, i.e. from the side of the flywheel. By using the bores 18 with different depths, the crankshaft is positioned with a predetermined orientation in the engine block. The gear 22 is then attached to the camshaft 10 with the line passing through the centres of the bores 18 pointing in a predetermined direction e.g. to the right. With such orientation, it is possible to insert the bolts 24 for attaching the gear 22 as the bores in the gear 22 and the collar 20 will overly each other. While sliding the cam gear 22 in place, it is assured that the single alignment marking on the crankshaft gear 42 is located between the two markings of the cam gear 22 in order to obtain the correct valve timing.

Having thus described the invention, what is claimed as novel and desired to be secured by Letters Patent of the United States is:

1. A camshaft having alignment formations by means of which the camshaft can be supported, which formations additionally serve to enable the camshaft to be correctly oriented in relation to another component during assembly, said alignment formations comprising two bores of the same diameter but different depth.

2. A camshaft as claimed in claim 1, wherein means are provided at one axial end of the camshaft for driving the camshaft and wherein the alignment formations are located at the opposite axial end of the camshaft.

3. A camshaft as claimed in claim 2, wherein the two bores are located diametrically opposite each other.

4. An engine having a camshaft as claimed in claim 3, wherein the camshaft is driven by means of a gear located at the flywheel end of the engine crankshaft.

5. An engine as claimed in claim 4, wherein the gear on the crankshaft has a smaller diameter than a collar provided at the end of the crankshaft to receive the engine flywheel.

6. An engine having a camshaft, a crankshaft having a front and flywheel end, and a flywheel mounted on a collar located at the flywheel end of the crankshaft, wherein the camshaft is driven by means of a gear on the camshaft located at the flywheel end of the camshaft and meshing directly with a gear mounted on the crankshaft forward of the flywheel mounting collar, the gear on the crankshaft for driving the camshaft having a diameter smaller than the diameter of the flywheel mounting collar.

7. An engine as claimed in claim 6, wherein the flywheel mounting collar on the crankshaft is spaced from the camshaft driving gear on the crankshaft to allow timing markings on the meshing gears on the crankshaft and the camshaft to be seen with the crankshaft collar in situ.

8. An engine as claimed in claim 7, wherein the flywheel mounting collar on the crankshaft is chamfered on its side facing the crankshaft gear.

* * * * *